United States Patent
Watanabe et al.

[11] Patent Number: 6,126,875
[45] Date of Patent: Oct. 3, 2000

[54] PROCESS FOR PRODUCING A CONCRETE PRODUCT

[75] Inventors: Yoshiharu Watanabe; Hirotoshi Hagiwara, both of Nishi-kubiki-gun; Tetsuo Shibata, Tokyo; Takashi Shimamura, Tokyo; Masaru Murase, Tokyo; Hiroyoshi Serizawa, Tokyo, all of Japan

[73] Assignees: Denki Kagaku Kogyo Kabushiki Kaisha; Haneda Humepipe Co., Ltd., both of Tokyo, Japan

[21] Appl. No.: 09/069,316

[22] Filed: Apr. 29, 1998

[30] Foreign Application Priority Data

Sep. 22, 1997 [JP] Japan .................................. 9-273287

[51] Int. Cl.⁷ .................................................... C04B 24/04
[52] U.S. Cl. ..................... 264/40.4; 264/297.9; 264/333; 264/334
[58] Field of Search .................................. 264/40.4, 333, 264/297.9, 334, 336

[56] References Cited

U.S. PATENT DOCUMENTS 5,453,123  9/1995  Burge et al. .
5,531,825  7/1996  Gartner et al. .

FOREIGN PATENT DOCUMENTS 0 478 864  4/1992  European Pat. Off. .
0 789 006  8/1997  European Pat. Off. .
1 095 727  12/1958  Germany .

*Primary Examiner*—Karen Aftergut
*Attorney, Agent, or Firm*—Oblon, Spivak, McClelland, Maier & Neustadt, P.C.

[57] ABSTRACT

A process for producing a concrete product, which includes a step of preparing a primary concrete by mixing a super dry consistency concrete having a unit amount of water of at most 100 kg/cm³, a step of preparing a secondary concrete by weighing a suitable amount of the primary concrete and adding at least water, a water reducing agent and a setting accelerator thereto, followed by remixing, and a step of molding the secondary concrete in a formwork.

8 Claims, No Drawings

PROCESS FOR PRODUCING A CONCRETE PRODUCT

The present invention relates to a process for producing a concrete secondary product. Particularly, it relates to a process for producing a concrete product, whereby a mortar or concrete having a setting accelerator incorporated therein, is produced efficiently and can be released from the formwork in a short period of time.

Heretofore, a process for producing a concrete product used to be such that in a method by vibration molding, a concrete having a slump of from about 5 to 12 cm, is mixed, then put into a formwork, subjected to vibration molding and then to preliminary curing for about 2 hours, and upon termination of bleeding, ironing finish is applied, then the temperature is raised over a period of from 1 to 2 hours, and after the temperature reaches the maximum level (65 to 75° C.), the molded product is maintained for from 2 to 3 hours, then taken out, cooled over a period of from 30 minutes to 1 hour and then released from the formwork.

Further, in the case of e.g. a hollow inclined wall employing a combination of vibration molding and centrifugal molding, a concrete having a slump of about 10 cm is put into a formwork, whereupon vibration molding and slight centrifugal molding are carried out, then preliminary curing is carried out for from 1 to 2 hours, and upon termination of bleeding, the upper portion is subjected to ironing finish, then the temperature is raised over about 1 hour, and after the temperature reaches the maximum level, the molded product is maintained for from 2 to 3 hours, then taken out, cooled over a period of from 30 minutes to 1 hour and then released from the formwork.

Namely, presently, for the production of a concrete product, it takes a long time of from 5 to 8 hours from mixing of concrete to releasing from the formwork, and the strength for releasing from the formwork is required to be from a few $N/mm^2$ to 10 $N/mm^2$ for a small size product or from 10 to 15 $N/mm^2$ for a large size product, although it may vary also depending upon the shape of the concrete product, the suspending method or the weight. Further, recently, a study has also been made on a process for the production by a high fluidity concrete without vibration, and in such a case, the time required till releasing from the formwork tends to be further prolonged.

Concrete products include various types, and even products of the same type have various sizes. Nevertheless, they are usually shipped in a large quantity. In order to meet such demands, it will be required to have various types of many expensive formworks, and a wide yard for products will be required.

In order to solve such problems, it is usually conceivable to use a cement which has hydraulicity and is capable of quickly providing strength, or to further incorporate a setting accelerator represented, for example, by a chloride to accelerate setting and curing of the concrete to increase the production efficiency. However, when such a cement having high hydraulicity or a setting accelerator is used, the slump drop of the concrete tends to be substantially large, whereby it will be required to quickly treat the mixed concrete. Accordingly, it will be difficult to mix a large amount of concrete at once, and it will be necessary to mix concrete separately by calculating volumes of concrete from the number of moldable concrete products and the practical operation time, thus leading to a problem of poor operation efficiency.

Especially when the production cycles including assembling of a formwork, arrangement of bar, molding of concrete, heat curing, releasing from the formwork, cleaning and assembling, are to be carried out continuously by an automatic or semiautomatic system, if a large amount of concrete is mixed all at once at the beginning, compacting into the formwork is likely to be impossible due to the slump drop, and not only the concrete will have to be disposed as waste, but also the system will have to be stopped.

Further, if the setting accelerator is employed to promote setting and curing of cement, and heat curing is also carried out, there will be a problem that long term strength tends to be low, although the strength for releasing from the formwork can be attained in a short time.

The present inventors have previously proposed a cement admixture capable of forming ettringite, which comprises a combination of gypsum, aluminum sulfate or alumstone, sodium sulfite, etc., in order to solve antinomy of increasing the strength in a short time and preventing deterioration of the long term strength among the above problems (JP-A-4-160042). However, such a proposal does not teach any improvement of the operation efficiency with respect to the method for producing a concrete.

The present inventors have conducted extensive researches to accomplish the objects of increasing the strength in a short time and preventing deterioration of the long term strength and to provide a process for producing a concrete product having the operation efficiency improved. As a result, they have found it possible to obtain a process for producing a concrete product, whereby the operation efficiency is good and releasing from the formwork can be carried out in a short time, by using a super dry consistency concrete as a primary concrete to be initially mixed (without addition of a setting accelerator), weighing an optional amount necessary for the production of a concrete product from the primary concrete, adding water, a water reducing agent and a setting accelerator thereto to obtain a secondary concrete having an optional softness, mixing the secondary concrete, molding it in a formwork, followed by heat curing at a temperature of from 40 to 100° C.

That is, the present invention provides a process for producing a concrete product, which comprises a step of preparing a primary concrete by mixing a super dry consistency concrete having a unit amount of water of at most 100 $kg/m^3$, a step of preparing a secondary concrete by weighing a suitable amount of the primary concrete and adding at least water, a water reducing agent and a setting accelerator thereto, followed by remixing, and a step of molding the secondary concrete in a formwork.

The process may include a further step of heat curing the molded secondary concrete at a temperature of from 40 to 100° C.

The step of preparing the secondary concrete is preferably repeated a plurality of times, while the step of preparing the primary concrete is carried out once.

It is preferred that the primary concrete is stored as mixed, and the primary concrete stored as mixed, is weighed separately in a plurality of times to prepare the secondary concrete.

It is also preferred that the primary concrete is weighed in suitable amounts separately in a plurality of times with intervals to prepare the secondary concrete.

Further, it is preferred that the setting accelerator comprises a component capable of forming ettringite and at least one salt selected from a thiosulfate, a rhodanate, a formate and a nitrate.

It is also preferred that after molding the secondary concrete in a formwork, heat curing is carried out at a temperature of from 40 to 100° C.

Still further, it is preferred that the primary concrete contains no setting accelerator.

Now, the present invention will be described in further detail with reference to the preferred embodiments.

The process for producing a concrete product of the present invention is a process wherein the primary concrete to be mixed first, is a super dry consistency concrete having a unit amount of water of at most 100 kg/m$^3$, then a suitable amount thereof is weighed at any optional time, then water, a water-reducing agent and a setting accelerator are added thereto, followed by remixing to obtain a wet consistency secondary concrete, which is then molded in a formwork.

The primary concrete in the present invention is prepared by mixing cement and aggregate (coarse aggregate and fine aggregate), if necessary, together with a suitable amount of a water reducing agent, or a setting retarder, without addition of a setting accelerator. However, the unit amount of water is at most 100 kg/m$^3$, and the slump is not more than 0 cm, whereby it is in a state of crumbling concrete having wet sand and aggregate mixed.

The setting retarder may, for example, be an organic salt such as an oxycarboxylic acid, a polybasic carboxylic acid or a polyoxycarboxyolic acid, or its salt, oligosaccharide, boric acid, phosphoric acid or an inorganic salt such as silicon fluoride.

The unit amount of water is defined to be at most 100 kg/m$^3$, because if it exceeds 100 kg/m$^3$, the concrete may sometimes be partially granulated to form agglomerates during mixing, irrespective of the blend composition of concrete, such being undesirable. The lower limit is not particularly limited so long as the unit amount of water is at most 100 kg/m$^3$ and no agglomerates will be formed However, when an improvement in the water reducing ratio by addition of a water-reducing agent in the production of the secondary concrete as described hereinafter, is desired, it is preferred to carry out the mixing with a unit amount of water at a level of the amount of the surface water of the aggregate, and a humidity of a level sufficient to suppress dusting is preferred also from the viewpoint of maintaining the uniformity of the primary concrete.

Namely, if a normal production process is considered, the aggregate can not be brought to a surface-dried state or to an absolute dry condition, and the aggregate in its entirety has surface water of from about 1 to 5 wt %, and it is most preferred to carry out the mixing with a unit amount of water being from 20 to 90 kg/m$^3$.

According to the present invention, such a primary concrete has merits such that even when treating time is prolonged more or less, and a hydration reaction has proceeded, it can readily be disintegrated, and the handling efficiency in transportation or weighing will rather be improved, and it will be possible to store it as mixed in a large amount and to reduce the overall unit amount of water by using a water-reducing agent at the time of mixing the secondary concrete, and further the effect for reducing the unit amount of water by later addition of this water-reducing agent, increases, as the time for storing the primary concrete as mixed, prolongs.

In the present invention, such a primary concrete is weighed in a necessary amount, and at least water, a water-reducing agent and a setting accelerator are added thereto, followed by mixing to obtain a secondary concrete having an optional level of softness.

In the present invention, the water/cement ratio of the concrete is at most 50 wt %, provided that the amount of water in the water/cement ratio indicates the amount of water contained in the final secondary concrete.

The smaller the water/cement ratio, the larger the strength in a short time or the long term strength. However, it is preferably at most 45 wt %, most preferably from 42 to 20 wt %. If it exceeds 50 wt %, the strength in a short time tends to be hardly obtainable. On the other hand, if it is less than 20 wt %, the unit amount of cement tends to be too much, and the amount of the water-reducing agent required to obtain a proper slump or slump flow, tends to be large, whereby the setting retardation tends to be large, and it tends to be difficult to obtain the strength in a short time, such being undesirable.

In the present invention, softness of the secondary concrete is not particularly limited so long as it is moldable. However, for vibration molding, the secondary concrete preferably has a slump of at least 5 cm, and it may be made to be a high fluidity concrete having a slump flow of from 50 to 70 cm.

In the present invention, superplasticizer, a high-range AE water-reducing agent or a thickener may, optionally, be used to control the slump or the water/cement ratio of concrete, to increase the fluidity or to prevent bleeding or sedimentation of aggregate, as is commonly employed in conventional methods.

The superplasticizer is a water-reducing agent of e.g. a melamine formalin resin sulfonate type or a polyalkylallyl-sulfonate type, such as a naphthalenesulfonic acid formalin condensate type, a methylnaphthalenesulfonic acid formalin condensate type or an anthracenesulfonic acid formalin condensate type, or a cocondensate thereof with lignin, and even when added in a relatively large amount, it has no air-entraining property and a large water-reducing rate and is free from abnormal setting or excessive delay in setting.

The high-range AE water-reducing agent is a water-reducing agent of a polycarboxylate type having an air-entraining property and a large water-reducing rate.

The amount of such a water-reducing agent is also not particularly limited. However, from a usual amount of use, a preferred range of the superplasticizer is from 0.4 to 1.5 parts by weight as solid content per 100 parts by weight of cement, and the high-range AE water-reducing agent has not only a high water-reducing property but also a setting retarding property, and its amount is accordingly preferably up to twice the maximum value prescribed by the manufacturers.

In the present invention, the setting accelerator comprises a component capable of forming ettringite or at least one salt selected from a thiosulfate, a rhodanate, a formate and a nitrate.

As its molecular formula AFt($C_3A$ $CaSO_4$ $32H_2O$, where C=CaO, and A=$Al_2O_3$) indicates, the component capable of forming ettringite (hereinafter referred to as an AFt component) is not particularly limited so long as it is a single component of a soluble or reactive sulfate compound, or a combination of a sulfate compound and calcium aluminate or an aluminate compound.

Specifically, it may be a combination of a gypsum and at least one member selected from $C_3A$, an aluminate having $Na_2O$ or $K_2O$ solid-solubilized therein, and crystalline or non-crystalline calcium aluminate comprising, as the main component, Ca, $C_2A_7$, $C_3A_3CS$, where S=$SO_3$, and an aluminate compound such as sodium aluminate or potassium aluminate (hereinafter referred to as C—A).

Further, among sulfate compounds, aluminum sulfate, alum or alunite (inclusive of a calcined product, hereinafter referred to as alum or the like) may be incorporated alone, and it instantaneously reacts with slaked lime discharged by a hydration reaction of cement to form AFt and thereby accelerate the setting and curing. However, it may be incorporated in combination with a gypsum and/or C—A.

Further, a gypsum added alone, will react with e.g. a calcium aluminate such as $C_3A$ or $C_4AF$ in the cement to form AFt, but such single addition of a gypsum is not desirable, since it slows down the hydration speed of alite and consequently delays the development of strength in a short period of time, although the long term strength may be increased. However, when used in combination with C—A, alum or the like, the gypsum will accomplish both the strength in a short time and increase of the long term strength.

Further, in the present invention, it is possible to use a sodium, potassium, calcium or magnesium salt such as a thiosulfate, a rhodanate, a formate or a nitrate (hereinafter referred to as a thiosulfate or the like), which has been known as a setting accelerator.

The thiosulfate or the like does not form AFt but accelerates the hydration reaction of alite, and, as the amount increases in the single use, it tends to impair the long term strength although the strength in short time may be increased. By its combined use with a gypsum or other component capable of forming ettringite, deterioration in the long term strength can be prevented or reduced. Therefore, the combined use is preferred to the single use.

In the foregoing, the gypsum is not particularly limited with respect to its type, and it may be not only an insoluble or hardly soluble II-type anhydrous gypsum, but also gypsum dihydrate, hemihydrate gypsum or a III-type anhydrous gypsum. In view of the long term strength, preferred is a II-type anhydrous gypsum which is referred to as an insoluble or hardly soluble gypsum.

The amount of the gypsum is, in the case of combined use with C—A or with at least one member selected from alum or the like and a thiosulfate or the like, at most 9 parts by weight, preferably from 0.5 to 6 parts by weight, most preferably from 1 to 4 parts by weight, as calculated as $CaSO_4$, per 100 parts by weight of cement. If it exceeds 9 parts by weight, the delay in hydration of alite tends to be so large that the strength in short time tends to be hardly obtainable, and the increase in the long term strength tends to be suppressed. Further, if it is less than 0.5 part by weight, the effect of increasing the long term strength tends to be small, such being undesirable.

C—A or alum or the like is preferably used within a range not to bring about rapid setting or pseudo setting.

For example, it is preferred that the amount of calcium aluminate among C—A is at most 3 parts by weight per 100 parts by weight of cement, the amount of a gypsum is from 0.5 to 3 times (by weight) of the amount of C—A, and the total amount of both is at most 12 parts by weight. More preferably, the weight ratio of C—A/gypsum is from 1/0.8 to 1/2, and the total amount is from 1.8 to 9 parts by weight. Irrespective of the blend ratio with the gypsum, if the amount of C—A exceeds 3 parts by weight, rapid setting is likely to take place, and if the total amount of both is less than 1.8 parts by weight, no adequate strength in short time or no adequate long term strength tends to be obtainable, and if it exceeds 12 parts by weight, the proportion of the gypsum tends to be too large that no adequate strength in short time tends to be hardly obtainable.

When an aluminate compound is used among C—A, irrespective of the amount of the co-existing gypsum, it is at most 1 part by weight, preferably at most 0.8 part by weight, more preferably from 0.2 to 0.5 part by weight, per 100 parts by weight of cement. If it exceeds 1 part by weight, rapid setting is likely to take place, and if it is less than 0.2 part by weight, the strength in short time tends to be small.

The amount of alum or the like is at most 2.5 parts by weight, preferably from 0.1 to 2.0 parts by weight, most preferably from 0.2 to 1.5 parts by weight, per 100 parts by weight of cement, in a total amount as calculated as its anhydride, whether it is incorporated alone or in combination with a gypsum or with a gypsum and C—A. If it is less than 0.1 part by weight, the effect for the development of strength in short time tends to be small, such being undesirable, and if it exceeds 2.5 parts by weight, deterioration in the long term strength tends to be substantial, and even with the same type of cement, rapid setting may take place if the brand or lot differs, such being undesirable.

The amount of the thiosulfate or the like is from 0.1 to 3 parts by weight, preferably from 0.2 to 2 parts by weight, most preferably from 0.3 to 1.5 parts by weight, per 100 parts by weight of cement, irrespective of whether it is used in combination with a gypsum, with a gypsum and C—A, with alum or the like, with alum or the like and a gypsum, or with alum or the like, a gypsum and C—A. If it is less than 0.1 part by weight, no adequate strength in short time tends to be obtainable, and if it exceeds 3 parts by weight, even if it is used in combination with a gypsum, deterioration in the long term strength tends to be remarkable, and in some cases, rapid setting is likely to take place, such being undesirable.

In the present invention, the setting accelerator may be incorporated in a powder state. However, it is preferred to incorporate it in the form of a suspension or an aqueous solution, whereby the dispersibility in concrete will be good, the effect for increasing the strength of concrete will be improved, and the strength in a short time and the long term strength will be high, such being desirable. In such a case, as the water to be used for the suspension or the solution, a part or whole of water remained in the step of mixing the primary concrete, may be used, and a suitable amount of a water-reducing agent may be added thereto. Preparation of such a suspension or an aqueous solution may be carried out immediately prior to mixing the concrete. Otherwise, depending upon the combination with the setting accelerator, it may be prepared a few days ahead without leading to deterioration of the performance.

The secondary concrete of the present invention is mixed to have an appropriate softness (slump or slump flow) as the case requires, then molded into a formwork and subjected to heat curing. In such a case, the maximum temperature is from 40 to 100° C., and the higher the maximum temperature, the shorter the time to obtain the strength for releasing from the formwork. However, if it exceeds 100° C., the prolongation of the long term strength tends to be impaired, and if it is lower than 40° C., there will be delay in obtaining adequate strength in short time, such being undesirable. It is preferably from 45 to 90° C., more preferably from 50 to 80° C.

There is no particular limitation as to the time for heat curing after the molding or as to the temperature raising time or method. In the case of a conical formwork for an inclined wall where constraint is strong, the heat curing may be carried out immediately without bringing about thermal expansion of concrete. Even in the case of a precast plate having the upper portion entirety open without constraint, precuring may be carried out for from 30 minutes to 1 hour within a temperature range of from about 40 to 50° C. not to bring about thermal expansion and to accelerate setting and curing, and then may be cured at a high temperature, so that the thermal expansion can be prevented, and excellent long term strength and the strength for releasing from the formwork in a short time, can be obtained.

Further, the heating method is not particularly limited. Specifically, however, it may be heating by steam as a conventional method, or the temperature of the atmosphere may be controlled by circulating hot water or hot oil having a controlled temperature in a pipe disposed in the floor of the curing tank. Otherwise, the formwork may have a jacket, so that the temperature-controlled hot water or hot oil may be circulated therein. Further, it is possible to employ a method of heating the formwork directly or indirectly by means of electrical resistance, or a method of heating the interior of the concrete directly by electromagnetic waves.

In the present invention, it is preferred to incorporate at least one member from silica fume, metakaolin and calcined products of clay minerals such as acid clay, activated clay, zeolite and bentonite (hereinafter referred to as active silica or the like) in order to further improve the long term strength. In such a case, the amount of active silica or the like is at most 10 parts by weight, preferably at most 6 parts by weight, more preferably from 0.2 to 3 parts by weight, per 100 parts by weight of cement, as the amount of single use of silica fume or the calcined product of the clay mineral, or as the total amount in the case where they are used in combination. If the amount is less than 0.2 part by weight, no adequate effect for improving the long term strength tends to be obtained, and even if it exceeds 10 parts by weight, no further increase in the effect for improvement can be expected, such being uneconomical and undesirable.

Further, addition of active silica or the like may be made at the time of mixing the primary concrete or the secondary concrete.

According to the process for producing a concrete product of the present invention, firstly, in the first step, a super dry consistency concrete having a unit amount of water of at most 100 kg/m$^3$ is mixed to prepare a primary concrete. Then, in the second step, the primary concrete is weighed in a suitable amount, and at least water, a water reducing agent and a setting accelerator are added thereto, followed by remixing to prepare a wet consistency secondary concrete. Further, in the third step, the secondary concrete is molded in a formwork.

As described above, according to the present invention, in the first step, the primary concrete is stored as mixed, and in the second step, the primary concrete stored as mixed can be weighed separately in a plurality of times at optional times to prepare the secondary concrete. Specifically, the second step of preparing the secondary concrete can be carried out in a plurality of times, while the first step of preparing the primary concrete may be carried out only once to prepare and store the primary concrete as mixed.

Further, in the present invention, the concrete blend is not particularly limited. Namely, to a currently used concrete blend, the setting accelerator of the present invention may be added, and the water/cement ratio is maintained to be constant by adjusting the amount of a water-reducing agent, whereby the strength for releasing the formwork can be attained in a shorter time than the concrete without such addition, and long term strength of at least equal to the case of no addition can be obtained.

The cement in the present invention includes, in addition to various portland cements and belite cements, a mixed cement having a mixing material such as a blast furnace slag, fly ash or silica mixed. The present invention can not be applied to a cement containing a large amount of $C_{11}A_7CaF_2$, amorphous $C_{12}A_7$ or CA and having a rapid curing property.

The process for producing a concrete product of the present invention is suitable for the production of concrete products which are produced by vibration molding or centrifugal molding, such as Hume pipes, manholes (inclined walls), segments, precast plates, box culverts, pontoons, U-tubes, L-type retaining walls, beams, cross beams, road or bridge parts and various blocks. However, the concrete products are not limited to such specific examples.

Now, the present invention will be described in further detail with reference to Examples. However, it should be understood that the present invention is by no means restricted to such specific Examples.

EXAMPLE 1

A concrete was prepared in accordance with the basic formulation of concrete as identified in Table 1.

Using cement, fine aggregate (sand) having 5% of surface water and 0.5% of coarse aggregate (crushed stone) (unit amount of water: 46 kg/m$^3$), a concrete in an amount of 20 lit. was mixed to obtain a primary concrete. Twenty minutes later, a gypsum as an AFt-forming component, aluminum sulfate, calcined alum or a product obtained by calcining alunite at 600° C. (alum or the like), and C—A or a setting accelerator such as a thiosulfate, are added in the amounts to the cement content in the primary concrete, as shown in Tables 2 to 7, in an optional combination by varying their amounts, and the remaining mixing water (unit amount of water: 116 kg/m$^3$) and a water-reducing agent were added to obtain a secondary concrete. At that time, the slump was adjusted by controlling the amount of the stock solution of the water-reducing agent and recorded.

TABLE 1

| Maximum aggregate size (mm) | Slump (cm) | Amount of air (%) | Fine aggregate ratio (%) | Water/cement ratio (%) |
|---|---|---|---|---|
| 20 | 8 ± 2 | 2 ± 1 | 46 | 39 |

Unit amount (kg/m$^3$)

| water | Cement | Sand | Crushed stone | Water-reducing agent |
|---|---|---|---|---|
| 162 | 400 | 829 | 990 | 4 |

The mixed secondary concrete was molded in a capless formwork of 10 cm in diameter×20 cm by a rod-form vibrator and after placing an iron plate having a thickness of 2 cm on the placing surface, put into a steam curing chamber preliminarily set at 65° C. 2.5 Hours later, the product was taken out and released from the formwork, whereupon the compression strength was immediately measured. Further, a separate sample released from the formwork upon expiration of 2.5 hours, was subjected to standard curing, and the strength on the 28th day was measured. The results are shown in Tables 2 to 7.

For each concrete, mixing was carried out in a room of 20±3° C., and the setting accelerator or the like was directly added to the primary concrete in a powder state, followed by dry mixing for 20 seconds, and then in such a manner as described above, the mixture was mixed by a pan-type forcible mixer having a capacity of 30 lit. for 120 seconds.

Further, in all Examples, the setting accelerator such as a gypsum or the like, was added in an amount represented by parts by weight calculated as an anhydride per 100 parts by weight of cement, and the alunite such as alum or the like was added taking the purity into account.

Materials Used (1) Concrete Material a: Cement: Normal portland cement (manufactured by Nippon Cement K.K.)

b: Sand: Produced in Himekawa, Niigata prefecture, Japan c: Crushed stone: Crushed stone produced in Himekawa, Niigata prefecture, Japan d: Water-reducing agent: Denka FT500 (polyalkylallyl-sulfonate type, liquid, solid content: 43 wt %, manufactured Denki Kagaku Kogyo K.K.)

(2) Setting Accelerator

A: Gypsum

A-1: II-type anhydrous gypsum (fluorogypsum, fineness: 6,000 cm$^2$/g)

A-2: Gypsum dihydrate (reagent, fineness: 3,000 cm$^2$/g)

A-3: Hemihydrate gypsum (reagent, fineness: 5,400 cm$^2$/g)

A-4: III-type anhydrous gypsum (obtained by heat treating A-2 at 180° C.)

B: Alum or the like

B-1: Aluminum sulfate (18 hydrate, industrial material, granular)

B-2: Calcined alunite (produced in Katsumitsuyama, purity: 90%, fineness: 1,500 cm$^2$/g)

B-3: Potassium alum (calcined product)

C: C—A

C-1: Amorphous product obtained by melting $C_{12}A_7$ composition, followed by quenching (fineness: 6,000 cm$^2$/g)

C-2: CA, commercially available alumina cement (Alumina No. 2, manufactured by Denki Kagaku Kogyo K.K.)

C-3: Sodium aluminate (reagent)

D: Thiosulfates or the like

D-1: Sodium thiosulfate (reagent)

D-2: Calcium formate (reagent)

D-3: Calcium nitrate (reagent)

D-4: Sodium rhodanate

E: Active silica or the like

E-1: Silica fume (manufactured by Elchem Co.)

E-2: Product obtained by calcining acid clay at 800° C. (product produced by Kanto Bentonite Kogyo K.K. was calcined and pulverized, fineness: 8,500 cm$^2$/g)

TABLE 2

| Test No. | Setting accelerator (parts by weight) Gypsum (parts by weight) | Alum or the like (parts by weight) | C-A | Thio-sulfate or the like | Amount of water-reducing agent (kg/m$^3$) | Compression strength (N/mm$^2$) 2.5 hrs | 28 days | Notes |
|---|---|---|---|---|---|---|---|---|
| 1-1 | — | — | — | — | 4.0 | 0.5 | 40.3 | Comparative |
| 1-2 | A-1 0.5 | — | — | — | 4.0 | 0.4 | 41.4 | Reference |
| 1-3 | A-1 1.0 | — | — | — | 4.0 | 0.3 | 43.8 | Reference |
| 1-4 | A-1 2.0 | — | — | — | 4.0 | 0.2 | 45.7 | Reference |
| 1-5 | A-1 4.0 | — | — | — | 3.9 | 0.1 | 48.6 | Reference |
| 1-6 | A-1 6.0 | — | — | — | 3.8 | 0 | 50.4 | Reference |
| 1-7 | A-1 9.0 | — | — | — | 3.6 | 0 | 45.3 | Reference |
| 1-8 | — | B-1 0.1 | — | — | 4.1 | 1.8 | 41.5 | Invention |
| 1-9 | — | B-1 0.2 | — | — | 4.5 | 6.5 | 42.2 | Invention |
| 1-10 | — | B-1 0.5 | — | — | 5.0 | 10.8 | 44.7 | Invention |
| 1-11 | — | B-1 1.0 | — | — | 6.1 | 12.7 | 43.1 | Invention |
| 1-12 | — | B-1 1.5 | — | — | 8.0 | 14.6 | 41.6 | Invention |
| 1-13 | — | B-1 2.0 | — | — | 10.1 | 16.5 | 38.8 | Invention |
| 1-14 | — | B-1 2.5 | — | — | 14.0 | 18.0 | 36.0 | Invention |

TABLE 3

| Test No. | Setting accelerator (parts by weight) Gypsum (parts by weight) | Alum or the like (parts by weight) | C-A | Thio-sulfate or the like | Amount of water-reducing agent (kg/m$^3$) | Compression strength (N/mm$^2$) 2.5 hrs | 28 days | Notes |
|---|---|---|---|---|---|---|---|---|
| 1-15 | A-1 0.5 | B-1 0.1 | — | — | 4.0 | 1.6 | 42.9 | Invention |
| 1-16 | A-1 1.0 | B-1 0.2 | — | — | 4.3 | 6.3 | 45.6 | Invention |
| 1-17 | A-1 2.0 | B-1 0.5 | — | — | 4.8 | 10.7 | 47.8 | Invention |
| 1-18 | A-1 3.0 | B-1 1.0 | — | — | 5.6 | 12.6 | 48.4 | Invention |

TABLE 3-continued

| Test No. | Gypsum (parts by weight) | Alum or the like (parts by weight) | C-A | Thio-sulfate or the like | Amount of water-reducing agent (kg/m³) | Compression strength (N/mm²) 2.5 hrs | Compression strength (N/mm²) 28 days | Notes |
|---|---|---|---|---|---|---|---|---|
| 1-19 | A-1 4.0 | B-1 1.5 | — | — | 7.4 | 14.3 | 46.0 | Invention |
| 1-20 | A-1 6.0 | B-1 2.0 | — | — | 9.2 | 13.8 | 42.2 | Invention |
| 1-21 | A-1 9.0 | B-1 2.5 | — | — | 12.9 | 13.2 | 39.4 | Invention |
| 1-22 | A-1 1.0 | B-1 1.5 | — | — | 7.8 | 14.8 | 43.9 | Invention |
| 1-23 | A-1 2.0 | B-1 1.0 | — | — | 5.4 | 12.2 | 45.3 | Invention |
| 1-24 | A-1 3.0 | B-1 0.5 | — | — | 4.5 | 9.6 | 46.0 | Invention |
| 1-25 | A-1 4.0 | B-1 0.2 | — | — | 4.2 | 4.1 | 47.5 | Invention |

TABLE 4

| Test No. | Gypsum (parts by weight) | Alum or the like (parts by weight) | C-A | Thio-sulfate or the like | Amount of water-reducing agent (kg/m³) | Compression strength (N/mm²) 2.5 hrs | Compression strength (N/mm²) 28 days | Notes |
|---|---|---|---|---|---|---|---|---|
| 1-26 | A-2 2.0 | B-1 0.5 | — | — | 4.6 | 10.4 | 45.0 | Invention |
| 1-27 | A-3 2.0 | B-1 0.5 | — | — | 4.9 | 11.3 | 45.1 | Invention |
| 1-28 | A-4 2.0 | B-1 0.5 | — | — | 5.0 | 11.9 | 44.9 | Invention |
| 1-29 | A-1 0.5 | B-2 0.2 | — | — | 4.2 | 3.7 | 42.3 | Invention |
| 1-30 | A-1 1.0 | B-2 0.5 | — | — | 4.5 | 7.4 | 43.9 | Invention |
| 1-31 | A-1 2.0 | B-2 1.0 | — | — | 5.0 | 9.6 | 44.6 | Invention |
| 1-32 | A-1 3.0 | B-2 1.5 | — | — | 6.3 | 11.4 | 46.2 | Invention |
| 1-33 | A-1 4.0 | B-2 2.0 | — | — | 7.5 | 10.3 | 44.9 | Invention |
| 1-34 | A-1 0.5 | B-3 0.2 | — | — | 4.3 | 6.0 | 43.2 | Invention |
| 1-35 | A-1 1.0 | B-3 0.5 | — | — | 4.8 | 9.8 | 44.9 | Invention |
| 1-36 | A-1 2.0 | B-3 1.0 | — | — | 5.8 | 11.5 | 45.8 | Invention |
| 1-37 | A-1 3.0 | B-3 1.5 | — | — | 7.6 | 12.7 | 46.2 | Invention |
| 1-38 | A-1 4.0 | B-3 2.0 | — | — | 9.4 | 13.0 | 43.2 | Invention |

TABLE 5

| Test No. | Gypsum (parts by weight) | Alum or the like (parts by weight) | C-A | Thio-sulfate or the like | Amount of water-reducing agent (kg/m³) | Compression strength (N/mm²) 2.5 hrs | Compression strength (N/mm²) 28 days | Notes |
|---|---|---|---|---|---|---|---|---|
| 1-39 | A-1 1.5 | — | C-1 3.0 | — | 4.2 | 4.2 | 38.5 | Invention |
| 1-40 | A-1 2.0 | — | C-1 2.5 | — | 4.0 | 5.1 | 40.8 | Invention |
| 1-41 | A-1 2.25 | — | C-1 2.25 | — | 4.0 | 5.8 | 41.2 | Invention |
| 1-42 | A-1 3.0 | — | C-1 1.5 | — | 4.0 | 4.0 | 43.6 | Invention |
| 1-43 | A-1 3.375 | — | C-1 1.125 | — | 4.0 | 2.0 | 45.7 | Invention |
| 1-44 | A-1 0.8 | — | C-2 1.0 | — | 4.0 | 2.9 | 40.9 | Invention |
| 1-45 | A-1 1.5 | — | C-2 1.5 | — | 4.0 | 4.2 | 41.7 | Invention |
| 1-46 | A-1 2.0 | — | C-2 2.0 | — | 4.0 | 5.3 | 42.0 | Invention |
| 1-47 | A-1 2.5 | — | C-2 2.5 | — | 4.0 | 6.1 | 43.6 | Invention |
| 1-48 | A-1 6.0 | — | C-2 3.0 | — | 4.0 | 4.2 | 46.7 | Invention |
| 1-49 | A-1 9.0 | — | C-2 3.0 | — | 4.0 | 1.7 | 48.5 | Invention |
| 1-50 | A-1 1.0 | B-1 0.5 | C-2 1.0 | — | 5.0 | 12.6 | 44.2 | Invention |
| 1-51 | — | B-1 0.5 | C-1 1.0 | — | 5.0 | 13.9 | 40.1 | Invention |

TABLE 6

| Test No. | Gypsum (parts by weight) | Alum or the like (parts by weight) | C-A | Thio-sulfate or the like | Amount of water-reducing agent (kg/m³) | Compression strength (N/mm²) 2.5 hrs | Compression strength (N/mm²) 28 days | Notes |
| --- | --- | --- | --- | --- | --- | --- | --- | --- |
| 1-52 | A-1 1.0 | — | C-3 0.4 | — | 4.0 | 7.2 | 42.3 | Invention |
| 1-53 | A-1 1.0 | B-1 1.0 | C-3 0.4 | — | 5.8 | 15.9 | 43.7 | Invention |
| 1-54 | — | — | — | D-1 0.1 | 4.0 | 1.5 | 40.6 | Invention |
| 1-55 | — | — | — | D-1 0.2 | 4.0 | 2.3 | 40.7 | Invention |
| 1-56 | — | — | — | D-1 0.3 | 4.0 | 4.6 | 39.2 | Invention |
| 1-57 | — | — | — | D-1 0.5 | 4.1 | 5.8 | 38.4 | Invention |
| 1-58 | — | — | — | D-1 1.0 | 4.2 | 7.4 | 38.1 | Invention |
| 1-59 | — | — | — | D-1 1.5 | 4.3 | 8.8 | 37.2 | Invention |
| 1-60 | — | — | — | D-1 2.0 | 4.4 | 9.9 | 34.3 | Invention |
| 1-61 | — | — | — | D-1 3.0 | 4.6 | 12.1 | 32.1 | Invention |

TABLE 7

| Test No. | Gypsum (parts by weight) | Alum or the like (parts by weight) | C-A | Thio-sulfate or the like | Amount of water-reducing agent (kg/m³) | Compression strength (N/mm²) 2.5 hrs | Compression strength (N/mm²) 28 days | Notes |
| --- | --- | --- | --- | --- | --- | --- | --- | --- |
| 1-62 | — | — | — | D-2 0.5 | 4.0 | 7.3 | 39.6 | Invention |
| 1-63 | — | — | — | D-3 0.5 | 4.0 | 4.9 | 38.7 | Invention |
| 1-64 | — | — | — | D-4 0.5 | 4.0 | 5.0 | 38.0 | Invention |
| 1-65 | A-1 3.0 | — | — | D-1 1.0 | 4.0 | 7.8 | 43.8 | Invention |
| 1-66 | A-1 3.0 | — | — | D-2 1.0 | 4.0 | 9.5 | 42.9 | Invention |
| 1-67 | A-1 3.0 | — | — | D-3 1.0 | 4.0 | 7.1 | 42.0 | Invention |
| 1-68 | A-1 3.0 | — | — | D-4 1.0 | 4.0 | 6.9 | 41.3 | Invention |
| 1-69 | A-1 3.0 | B-1 0.5 | — | D-2 1.0 | 4.6 | 12.9 | 46.7 | Invention |
| 1-70 | A-1 1.5 | — | C-1 1.5 | D-2 1.0 | 4.1 | 10.8 | 43.5 | Invention |
| 1-71 | A-1 1.5 | B-1 0.5 | C-1 1.5 | D-2 1.0 | 4.8 | 14.7 | 42.0 | Invention |
| 1-72 | — | B-1 0.5 | — | D-1 0.5 | 5.0 | 14.2 | 42.9 | Invention |

Notes

In the tests shown in Tables 2 to 7, in a case where no adequate strength was obtained in 2.5 hours, such a product was taken out from the steam curing chamber, then cured in a room of 20° C. till next day, then released from the formwork and then subjected to standard curing.

As shown in Table 2, in Comparative Examples employing a water-reducing agent only and in Reference Examples wherein only a gypsum is added as a component capable of forming AFt, no adequate strength for releasing from the formwork was obtained in 2.5 hours (Test Nos. 1-1 to 1-7), such being undesirable, although the 28 day strength increased as the amount of such an additive increased.

Alum or the like is effective, even when added alone, to form AFt and to increase the strength for releasing from the formwork, as the amount increases. The strength for releasing from the formwork remarkably increases when the amount exceeds 0.1 part by weight and at least 0.2 part by weight, but if the amount exceeds 1.5 parts by weight, the 28 day strength tends to decrease, and the amount is preferably at most 2.5 parts by weight, more preferably at most 2.0 parts by weight and most preferably at most 1.5 parts by weight (Test Nos. 1-8 to 1-14). When a gypsum and alum or the like are used in combination, the 28 day strength increases as the amount of the gypsum increases even when the amount of alum or the like increases, but if it becomes too much, the 28 day strength tends to no longer increase. Accordingly, it is evident that the gypsum is preferably at most 9 parts by weight, more preferably from 0.5 to 6 parts by weight, most preferably from 1 to 4 parts by weight (Test Nos. 1-15 to 1-21).

In a case where the amount of alum or the like is large as compared with the amount of the gypsum, the increase of the 28 day strength tends to be suppressed although the strength for releasing from the formwork in 2.5 hours is high, and in a reverse case, the 28 day strength tends to increase, although the strength for releasing from the formwork in 2.5 hours tends to be suppressed (Test Nos. 1-22 to 1-25). Even if the type of the gypsum is changed, in the combined use with alum or the like, the strength for releasing from the formwork in 2.5 hours and the 28 day strength show substantially the same values, but only the 28 day strength of II-type anhydrous gypsum tends to increase (Test Nos. 1-17 and 1-26 to 1-28). Also in a case where the type of alum or the like is changed, the strength for releasing from the formwork in 2.5 hours and the 28 day strength show a similar tendency (Test Nos. 1-15 to 1-21 and 1-29 to 1-38).

In a case where C—A is calcium aluminate, if the blend proportion of the gypsum decreases, the long term strength tends to be not prolonged, and if it increases, the strength in a short time tends to be small. It is shown that the best results are obtainable in a weight ratio of C—A/gypsum being within a range of from 1/0.8 to 1/2 (Test Nos. 1-39 to 1-43).

Further, it is shown that the total amount of C—A and the gypsum is preferably within a range of from 1.8 to 12 parts by weight from the viewpoint of the balance between the strength in a short time and the long term strength (Test Nos. 1-44 to 1-49).

A combination of proper amounts of the gypsum, alum or the like and C—A, or a combination of proper amounts of alum or the like and C—A, is preferred, since the strength in a short time can be increased without giving no substantial influence to the prolongation of the long term strength (Test Nos. 1-50, 1-51 and 1-53).

As the amount of thiosulfate or the like increases, the strength in a short time increases, but the long term strength tends to decrease. Particularly, when it is at least 0.3 part by weight, the strength in a short time tends to increase, and when it exceeds 1.5 parts by weight, the long term strength tends to decrease substantially (Test Nos. 1-54 to 1-61). In the combined use with the gypsum, deterioration in the long term strength can be prevented, whereby the balance between the strength in a short time and the long term strength can be improved (Test Nos. 1-65 to 1-68). A combination of proper amounts of the thiosulfate or the like and at least one member from a gypsum, alum or the like and C—A, is more preferred, since the strength in a short time can further be improved without giving no substantial influence to the prolongation of the long term strength (Test Nos. 1-69 to 1-72).

EXAMPLE 2

Tests were carried out in the same manner as in Example 1 except that primary concretes were mixed by using the blend example of setting accelerators in Test No. 1-16 in Example 1 and adjusting surface waters of fine aggregate and coarse aggregate so that the unit amounts of water would be 0, 20, 30, 60, 70, 90, 100 and 120 kg/m$^3$, respectively. The results are shown in Table 8.

TABLE 8

| Test No. | Type | Unit amount of water (kg/m$^3$) | Amount of water-reducing agent (kg/m$^3$) | Compression strength (N/mm$^2$) | | Notes |
|---|---|---|---|---|---|---|
| | | | | 2.5 hrs | 28 days | |
| 2-1 | No. 1-16 | 0 | 4.8 | 3.8 | 43.1 | Invention |
| 2-2 | | 20 | 4.6 | 5.7 | 45.3 | Invention |
| 2-3 | | 30 | 4.4 | 6.0 | 45.8 | Invention |
| 2-4 | | 60 | 4.3 | 7.2 | 46.7 | Invention |
| 2-5 | | 70 | 4.2 | 9.3 | 47.0 | Invention |
| 2-6 | | 90 | 4.1 | 9.8 | 47.6 | Invention |
| 2-7 | | 100 | 4.0 | 10.2 | 45.2 | Invention |
| 2-8 | | 120 | 3.8 | 6.4 | 42.0 | Comparative |

It is shown that as the unit amount of water of the primary concrete increases, the amount of the water-reducing agent required to obtain the same slump with the same amount of total water, with the secondary concrete, tends to be small, and accordingly an improvement is observed in the strength in a short time and in the long term strength, but if it becomes too much, the primary concrete tends to granulate and probably because of poor dispersion in mixing the secondary concrete, both the strength in short time and the long term strength tend to decrease. It is shown that the upper limit of the unit amount of water is 100 kg/m$^3$. Further, with a view to simple mixing only with the surface water of aggregates and prevention of dusting, the unit amount of water is preferably from 20 to 90 kg/M$^3$.

EXAMPLE 3

Tests were carried out in the same manner as in Example 1 except that the secondary concretes were mixed by suspending the setting accelerators in Test Nos. 1-10, 1-17, 1-41, 1-50 and 1-69 in mixing water. The results are shown in Table 9.

TABLE 9

| Test No. | Type | Amount of water-reducing agent (kg/m$^3$) | Compression strength (N/mm$^2$) | | Notes |
|---|---|---|---|---|---|
| | | | 2.5 hrs | 28 days | |
| 3-1 | No. 1-10 | 5.2 | 12.8 | 45.9 | Invention |
| 3-2 | No. 1-17 | 5.0 | 13.7 | 49.0 | Invention |
| 3-3 | No. 1-41 | 4.0 | 7.2 | 42.8 | Invention |
| 3-4 | No. 1-50 | 5.3 | 15.7 | 46.2 | Invention |
| 3-5 | No. 1-69 | 4.8 | 14.8 | 47.9 | Invention |

As compared with the addition in a powder form in Example 1, the addition in the form of a suspension is more preferable in that both the strength in a short time and the long term strength can be improved.

EXAMPLE 4

Tests were carried out in the same manner as in Example 1 except that using the blend example of setting accelerators in Test No. 1-18 in Example 1, curing was carried out in a curing tank set at a curing temperature of 40, 45, 50, 70, 80, 90 and 100° C., respectively. The results are shown in Table 10.

TABLE 10

| Test No. | Type | Curing temperature (°C.) | Compression strength (N/mm$^2$) | | Notes |
|---|---|---|---|---|---|
| | | | 2.5 hrs | 28 days | |
| 4-1 | No. 1-18 | 40 | 1.7 | 43.9 | Invention |
| 4-2 | | 45 | 3.9 | 45.6 | Invention |
| 4-3 | | 50 | 10.3 | 47.3 | Invention |
| 4-4 | | 70 | 14.2 | 49.5 | Invention |
| 4-5 | | 80 | 17.6 | 47.8 | Invention |
| 4-6 | | 90 | 19.2 | 44.3 | Invention |
| 4-7 | | 100 | 22.0 | 39.4 | Invention |

It is shown that as the steam curing temperature increases, the strength in a short time increases, but if it becomes too high, the prolongation of the long term strength tends to be impaired, and in view of the balance of the two, it is preferably from 45 to 90° C., most preferably from 50 to 80° C.

EXAMPLE 5

Tests were carried out in the same manner as in Example 1 except that the secondary concrete was mixed after leaving the primary concrete in Test No. 2-5 in Example 2 to stand for 30, 40, 60 or 90 minutes. The results are shown in Table 11.

TABLE 11

| Test No. | Type | Time for leaving to stand (min) | Amount of water-reducing agent (kg/m³) | Compression strength (N/mm²) | | Notes |
| --- | --- | --- | --- | --- | --- | --- |
| | | | | 2.5 hrs | 28 days | |
| 5-1 | No. 2-5 | 30 | 4.2 | 9.8 | 46.2 | Invention |
| 5-2 | | 40 | 4.1 | 10.7 | 46.0 | Invention |
| 5-3 | | 60 | 3.9 | 12.5 | 45.1 | Invention |
| 5-4 | | 90 | 3.8 | 13.2 | 43.4 | Invention |

As the time for leaving the primary concrete to stand is prolonged, the amount of the water-reducing agent required to obtain the same slump in the same amount of total water, with the secondary concrete, tends to be small, and the strength in a short time tends to increase, but the long term strength tends to slightly decrease. However, it is shown that there is no particular problem if the treating time is about 90 minutes. This makes continuous supply and treatment of concrete possible and remarkably improves the operation efficiency when a line for automation is constructed.

EXAMPLE 6

Tests were carried out in the same manner as in Example 1 except that using the blend example of setting accelerators in Test No. 1-18 in Example 1, the type and the amount of active silica or the like were changed. The results are shown in Table 12. Further, in a case where the slump became small by the addition of the active silica or the like, the slump was adjusted by post addition of the stock solution of the water reducing agent. Further, the active silica or the like was added when the primary concrete was mixed.

TABLE 12

| Test No. | Type and amount (parts by weight) of active silica or the like | | Compression strength (N/mm²) | | Notes |
| --- | --- | --- | --- | --- | --- |
| | | | 2.5 hrs | 28 days | |
| 6-1 | E-1 | 0.2 | 13.5 | 49.6 | Invention |
| 6-2 | | 0.5 | 14.8 | 51.6 | Invention |
| 6-3 | | 1.0 | 15.3 | 52.3 | Invention |
| 6-4 | | 3.0 | 16.2 | 55.9 | Invention |
| 6-5 | | 6.0 | 17.6 | 57.8 | Invention |
| 6-6 | | 10.0 | 15.2 | 58.3 | Invention |
| 6-7 | E-2 | 0.5 | 13.7 | 50.4 | Invention |
| 6-8 | | 1.0 | 14.2 | 51.0 | Invention |
| 6-9 | | 3.0 | 16.0 | 52.8 | Invention |
| 6-10 | | 6.0 | 16.5 | 53.9 | Invention |
| 6-11 | | 10.0 | 17.1 | 54.1 | Invention |
| 6-12 | E-1 + E-2 = 0.5 + 1.0 | | 15.1 | 53.4 | Invention |

Note: The amount (parts by weight) of active silica or the like is the amount per 100 parts by weight of cement.

Active silica or the like shows, with a small amount of 0.2 part by weight, the effects for increasing the long term strength and the strength in a short time, but if it is added in an amount exceeding 6 parts by weight, the strength in a short time tends to decrease. This is attributable to the fact that the amount of the water-reducing agent required to attain the same slump, increases. Further, it is also shown that prolongation of the long term strength stops.

As described in the foregoing, according to the present invention, it is possible to produce a concrete product having excellent operation efficiency by preparing a primary concrete from a super dry consistency concrete having a unit amount of water of at most 100 kg/m³, weighing a suitable amount of concrete therefrom and adding a water-reducing agent, a setting accelerator and the rest of mixing water thereto to obtain a wet consistency concrete, and mixing and molding the wet consistency concrete.

Further, by heat-curing this concrete at a temperature of from 40 to 100° C., it is possible to produce a concrete product excellent in the strength in a short time and in the long term strength.

What is claimed is:

1. A process for producing a concrete product, which comprises a step of preparing a primary concrete by mixing a super dry consistency concrete having a unit amount of water of 20–100 kg/m³, a step of preparing a secondary concrete by weighing a suitable amount of the primary concrete and adding at least water, a water reducing agent and a setting accelerator thereto, followed by remixing, and a step of molding the secondary concrete in a formwork, wherein said setting accelerator, when it contains gypsum, excludes gypsum alone.

2. The process for producing a concrete product according to claim 1, which includes a further step of heat curing the molded secondary concrete at a temperature of from 40 to 100° C.

3. The process for producing a concrete product according to claim 1, wherein the step of preparing the secondary concrete is repeated a plurality of times, while the step of preparing the primary concrete is carried out once.

4. The process for producing a concrete product according to claim 1, wherein the primary concrete is stored as mixed, and the primary concrete stored as mixed, is weighed separately in a plurality of times to prepare the secondary concrete.

5. The process for producing a concrete product according to claim 1, wherein the primary concrete is weighed in suitable amounts separately in a plurality of times with intervals.

6. The process for producing a concrete product according to claim 1, wherein the setting accelerator comprises at least one member selected from the group consisting of a component for forming ettringite, a thiosulfate, a rhodanate, a formate and a nitrate.

7. The process for producing a concrete product according to claim 1, wherein the setting accelerator is added to the primary concrete in suspension or aqueous solution form.

8. The process for producing a concrete product according to claim 1, wherein the primary concrete contains no setting accelerator.

* * * * *